United States Patent
Seo et al.

(10) Patent No.: US 9,179,414 B2
(45) Date of Patent: Nov. 3, 2015

(54) DYNAMIC UPLINK POWER CONTROL METHOD AND DEVICE IN A WIRELESS COMMUNICATIONS SYSTEM

(75) Inventors: Han Byul Seo, Anyang-si (KR); Eun Sun Kim, Anyang-si (KR); Hak Seong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 243 days.

(21) Appl. No.: 13/497,243

(22) PCT Filed: Oct. 26, 2010

(86) PCT No.: PCT/KR2010/007370
§ 371 (c)(1),
(2), (4) Date: Mar. 20, 2012

(87) PCT Pub. No.: WO2011/052965
PCT Pub. Date: May 5, 2011

(65) Prior Publication Data
US 2012/0202554 A1    Aug. 9, 2012

Related U.S. Application Data (60) Provisional application No. 61/264,253, filed on Nov. 25, 2009, provisional application No. 61/255,824, filed on Oct. 28, 2009.

(51) Int. Cl.
*H04B 7/00* (2006.01)
*H04W 52/14* (2009.01)
*H04W 52/24* (2009.01)
*H04W 52/58* (2009.01)
*H04W 52/34* (2009.01)

(52) U.S. Cl.
CPC .......... *H04W 52/146* (2013.01); *H04W 52/244* (2013.01); *H04W 52/247* (2013.01); *H04W 52/248* (2013.01); *H04W 52/34* (2013.01); *H04W 52/58* (2013.01)

(58) Field of Classification Search
CPC ............ H04W 52/146; H04W 52/244; H04W 52/247; H04W 52/248; H04W 52/34; H04W 52/58
See application file for complete search history.

(56) References Cited

U.S. PATENT DOCUMENTS

2003/0068984 A1* 4/2003 Shin et al. ................ 455/69
2006/0034224 A1* 2/2006 Nakamata et al. ............ 370/331

(Continued)

FOREIGN PATENT DOCUMENTS

EP      1146760      10/2001

OTHER PUBLICATIONS

3GPP TS 25.214 V7.12.0, May 2009.*

*Primary Examiner* — Edward Urban
*Assistant Examiner* — Mohammed Rachedine
(74) *Attorney, Agent, or Firm* — Lee, Hong, Degerman, Kang & Waimey (57) ABSTRACT

A wireless communications system and, more particularly, to a dynamic uplink power control method and device in a wireless communications system are disclosed. A method for dynamically controlling an uplink transmission power at a base station is provided, the method includes the steps of receiving an uplink signal from a user equipment being served by the base station, deciding whether or not an uplink transmission to the base station from the user equipment causes an interference with another base station, and transmitting a transmission power control (TPC) command muting the uplink transmission to the user equipment.

9 Claims, 7 Drawing Sheets

(56) References Cited

U.S. PATENT DOCUMENTS

| | | |
|---|---|---|
| 2006/0083161 A1 | 4/2006 | Laroia et al. |
| 2007/0298798 A1* | 12/2007 | Hagerman et al. ............ 455/436 |
| 2008/0069033 A1* | 3/2008 | Li et al. .......................... 370/328 |
| 2008/0102878 A1* | 5/2008 | Tiedemann, Jr. ............. 455/522 |
| 2008/0151832 A1* | 6/2008 | Iwasaki ......................... 370/330 |
| 2009/0197630 A1* | 8/2009 | Ahn et al. ..................... 455/522 |

\* cited by examiner

DYNAMIC UPLINK POWER CONTROL METHOD AND DEVICE IN A WIRELESS COMMUNICATIONS SYSTEM

CROSS-REFERENCE TO RELATED APPLICATIONS

This application is the National Stage filing under 35 U.S.C. 371 of International Application No. PCT/KR2010/007370, filed on Oct. 26, 2010, which claims the benefit of U.S. Provisional Application Ser. Nos. 61/264,253, filed on Nov. 25, 2009, and 61/255,824, filed on Oct. 28, 2009, the contents of which are all incorporated by reference herein in their entirety.

TECHNICAL FIELD

The present invention relates a wireless communications system and, more particularly, to a dynamic uplink power control method and device in a wireless communications system.

BACKGROUND ART

Figure 1:
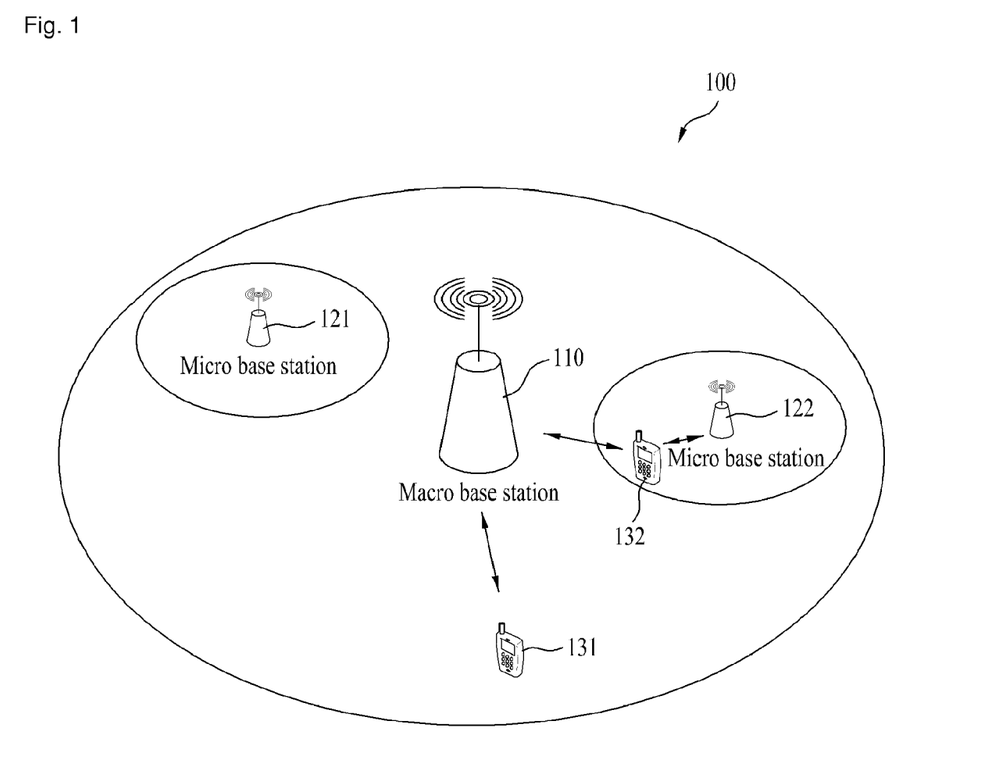
FIG. 1 illustrates a general view of a wireless communications system.

FIG. 1 illustrates a heterogeneous network wireless communications system 100 including a macro base station and a micro base station. In the description of the present invention, the term "heterogeneous network" refers to a network wherein a macro base station 110 and a micro base station 121 and 122 co-exist even when the same RAT (Radio Access Technology) is being used.

A macro base station 110 refers to a general base station of a wireless communication system having a broad coverage range and a high transmission power. Herein, the macro base station 110 may also be referred to a macro cell.

The micro base station 121 and 122 may also be referred to as a micro cell, a pico cell, a femto cell, a home eNB, a relay, and so on. More specifically, the micro base station 121 and 122 corresponds to a small-sized version of the macro base station 110. Accordingly, the micro base station 121 and 122 may independently perform most of the functions of the macro base station. Herein, the micro base station 121 and 122 may correspond to an overlay base station, which may be installed in an area covered by the macro base station, or to a non-overlay base station, which may be installed in a shadow area that cannot be covered by the macro base station. As compared to the macro base station 110, the micro base station 121 and 122 has a narrower coverage range and a lower transmission power and may accommodate a smaller number of terminals (or user equipments).

A terminal (or user equipment) 131 may directly receive services from (or be served by) the macro base station 110 (hereinafter referred to as a macro-terminal). And, alternatively, a terminal (or user equipment) 132 may directly receive services from (or be served by) the micro base station 121 (hereinafter referred to as a micro-terminal). In some cases, a terminal 132 existing within the coverage area of the micro base station 121 may receive services from the macro base station 110.

Depending upon whether or not the terminal (or user equipment) has limited access, the micro base station may be categorized into two different types, the first type being a CSG (Closed Subscriber Group) micro base station, and the second type being an OA (Open Access) or OSC (Open Subscriber Group) micro base station. More specifically, the CSG micro base station may serve (or transmit services to) only specific terminals that are authorized, and the OSG micro base station may serve (or transmit services to) all types of terminals without any particular access limitations.

DISCLOSURE OF INVENTION

Technical Problem

In the above-described heterogeneous network, an uplink signal outputted from a terminal being served by a macro base station may cause a strong interference to an adjacent (or neighboring) micro base station of the corresponding terminal. Alternatively, even when a terminal adjacent to a micro base station receives a downlink signal from the macro base station, such signal reception may cause a strong interference to the micro base station.

An object of the present invention is to provide a dynamic uplink power control method and device in a wireless communications system that can reduce inter-cell interference caused by various factors from the heterogeneous network.

Additional objects and features of the present application will be set forth in part in the description which follows and in part will become apparent to those having ordinary skill in the art upon examination of the following or may be learned from practice of the present application.

Solution to Problem

To achieve these objects and other advantages and in accordance with the purpose of the invention, as embodied and broadly described herein, according to an embodiment of the present invention, in a method for dynamically controlling an uplink transmission power from a base station, the method includes the steps of receiving an uplink signal from a user equipment being served by the base station, deciding whether or not an uplink transmission to the base station from the user equipment causes an interference with another base station, and transmitting a transmission power control (TPC) command muting the uplink transmission to the user equipment.

Also, in the step of deciding whether or not an uplink transmission to the base station from the user equipment causes an interference, the decision may be made based upon signaling performed by the user equipment or by the other base station.

Also, the TPC command muting the uplink transmission may include information setting the uplink transmission power to 0 or to a minimum value.

Also, the TPC command muting the uplink transmission may be indicated by a specific bit value of a TPC command field.

Also, the TPC command muting the uplink transmission may be indicated by having a specific bit value of a TPC command field consecutively set-up for N number of times (wherein N≥1).

Also, the TPC command muting the uplink transmission may be transmitted as downlink control information (DCI) through a physical downlink control channel (PDCCH).

Also, the TPC command muting the uplink transmission may include information on at least one of a component carrier, a frequency resource, and a physical channel having the respective uplink transmission muted.

Also, the TPC command muting the uplink transmission may include a command for muting the transmission of at least one of a scheduling request, a periodic channel quality information reporting, and a sounding reference signal.

To achieve these objects and other advantages and in accordance with the purpose of the invention, as embodied and broadly described herein, according to another embodiment of the present invention, in a method for dynamically controlling an uplink transmission power from a user equipment, the method includes the steps of transmitting an uplink signal to a base station, receiving information on uplink transmission muting, and muting the uplink transmission based upon the information on uplink transmission muting.

Herein, the step of muting the uplink transmission may include a step of setting the uplink transmission power to 0 or to a minimum value.

The method for dynamically controlling an uplink transmission power from further includes a step of transmitting a scheduling stop request signal to the base station.

Also, the information on the uplink transmission muting may include a transmission power control (TPC) command directing the uplink transmission from the base station to be muted.

Also, the TPC command muting the uplink transmission may be indicated by a specific bit value of a TPC command field.

Also, the TPC command muting the uplink transmission may be indicated by having a specific bit value of a TPC command field consecutively set-up for N number of times (wherein N≥1).

Also, the TPC command muting the uplink transmission may be received as downlink control information (DCI) through a physical downlink control channel (PDCCH).

Also, the TPC command muting the uplink transmission may include information on at least one of a component carrier, a frequency resource, and a physical channel having the respective uplink transmission muted.

Also, the TPC command muting the uplink transmission may include a command for muting the transmission of at least one of a scheduling request, a periodic channel quality information reporting, and a sounding reference signal.

Also, the information on uplink transmission muting may include information enabling the user equipment to decide whether or not to mute the uplink transmission.

Furthermore, the information enabling the user equipment to decide whether or not to mute the uplink transmission may include at least one of an identifier of a neighboring base station, a resource allocation information of a neighboring base station, a path loss reference value, and an intensity reference value for a received signal.

To achieve these objects and other advantages and in accordance with the purpose of the invention, as embodied and broadly described herein, according to yet another embodiment of the present invention, in a base station for dynamically controlling an uplink transmission power, the base station includes a receiving module configured to receive an uplink signal, a transmitting module configured to transmit a downlink signal, and a processor configured to control the receiving module and the transmitting module. Herein, the processor may receive an uplink signal from a user equipment being served by the base station through the receiving module, decide whether or not an uplink transmission to the base station from the user equipment causes an interference with another base station, and transmit a transmission power control (TPC) command muting the uplink transmission to the user equipment through the transmitting module.

To achieve these objects and other advantages and in accordance with the purpose of the invention, as embodied and broadly described herein, according to yet another embodiment of the present invention, in a user equipment for dynamically controlling an uplink transmission power, the base station includes a receiving module configured to receive a downlink signal, a transmitting module configured to transmit an uplink signal, and a processor configured to control the receiving module and the transmitting module. Herein, the processor may transmit an uplink signal to a base station through the transmitting module, receive information on uplink transmission muting, and mute the uplink transmission based upon the information on uplink transmission muting.

It is to be understood that both the foregoing general description and the following detailed description of the present invention are exemplary and explanatory and are intended to provide further explanation of the invention as claimed.

Advantageous Effects of Invention

According to the present invention, a dynamic uplink power control method and device in a wireless communications system that can reduce inter-cell interference occurring in the heterogeneous network is provided.

Additional advantages of the present application will be set forth in part in the description which follows and in part will become apparent to those having ordinary skill in the art upon examination of the following or may be learned from practice of the present application.

BRIEF DESCRIPTION OF DRAWINGS

The accompanying drawings, which are included to provide a further understanding of the invention and which are incorporated in and constitute a part of this application, illustrate embodiment(s) of the invention and together with the description serve to explain the principle of the invention. In the drawings.

BEST MODE FOR CARRYING OUT THE INVENTION

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between the base station and the terminal (or user equipment). Herein, the base station may refer to a terminal node of the network that performs direct communication with the terminal. Occasionally, in the description of the present invention, particular operations of the present invention that are described as being performed by the base station may also be performed by an upper node of the base station.

More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on. Also, in the description of the present invention, the term base station may also be used as a term including the concept of a cell or sector. Meanwhile, the term 'relay' may be replaced by terms including Relay Node (RN), Relay Station (RS), and so on. And, the term 'Terminal' may be replaced by terms including UE (User Equipment), MS (Mobile Station), MSS (Mobile Subscriber Station), SS (Subscriber Station), and so on.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the 3GPP LTE-A system. Nevertheless, the scope and spirit of the present invention will not be limited only to those of the 3GPP LTE system and the 3GPP LTE-A system.

Figure 2:
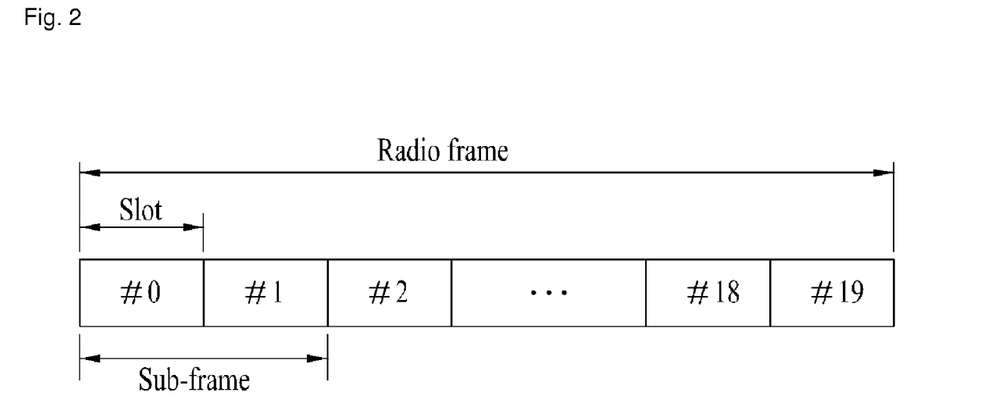
FIG. 2 illustrates an exemplary structure of a radio frame being used in a 3GPP LTE system.

FIG. 2 illustrates an exemplary structure of a radio frame being used in a 3GPP LTE system. One radio frame includes 10 sub-frames, and one sub-frame includes 2 slots in a time domain. The time for transmitting one sub-frame is defined as a Transmission Time Interval (TTI). For example, one sub-frame may have the length of 1 ms, and one slot may have the length of 0.5 ms. One slot may include a plurality of OFDM symbols in the time domain. Since the 3GPP LTE system uses the OFDMA method during a downlink, the OFDM symbol may indicate one symbol length. During an uplink, one symbol may be referred to as an SC-FDMA symbol or a symbol length. A Resource Block (RB) corresponds to a resource allocation unit, and, in a slot, the resource block (RB) includes a plurality of consecutive sub-carriers. However, the above-described radio frame structure is merely exemplary. Therefore, the number of sub-frames included in a radio frame, the number of slots included in one sub-frame, or the number of OFDM symbols being included in one slot may be varied in many different ways.

Figure 3:
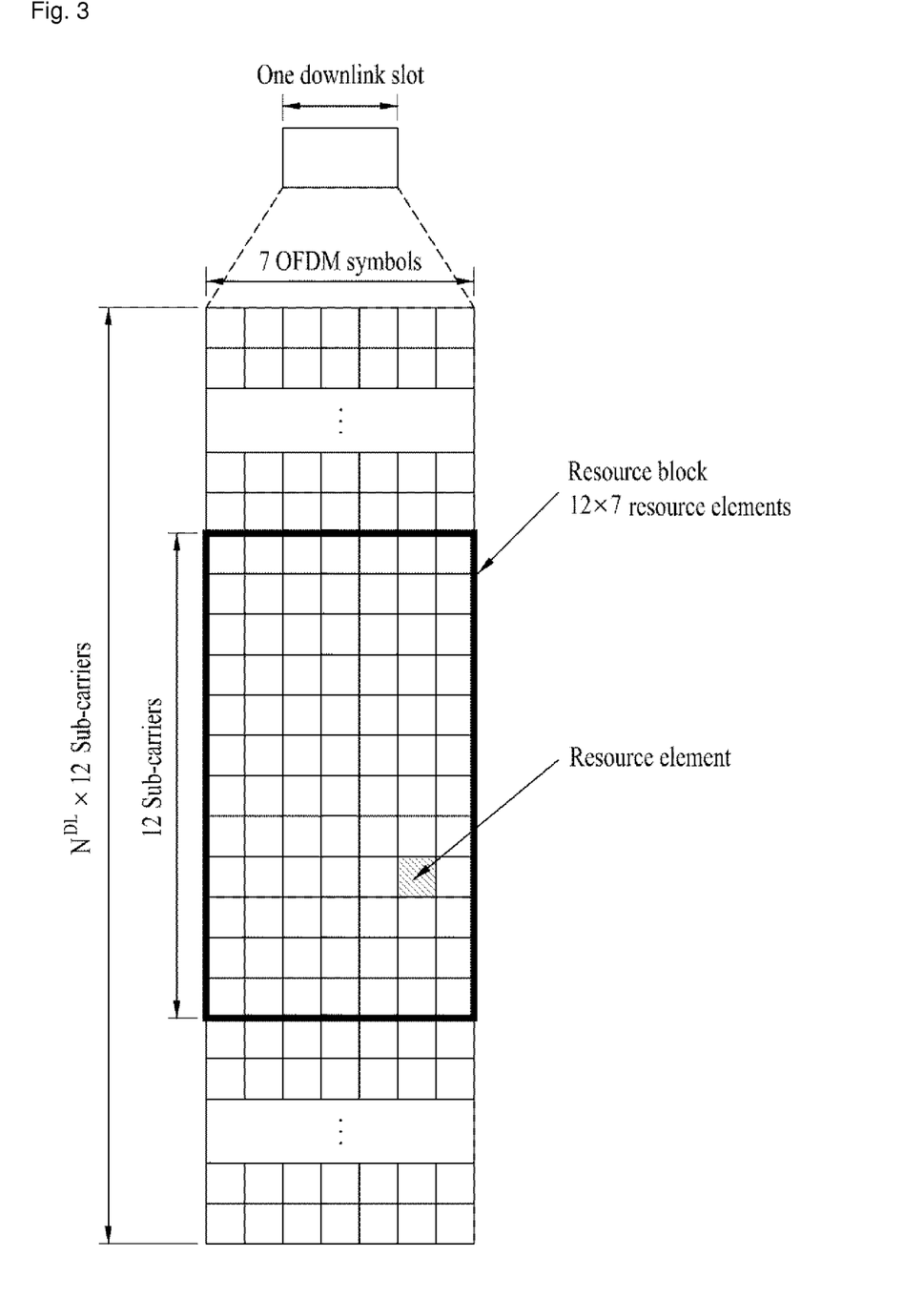
FIG. 3 illustrates a resource grid of a downlink slot.

FIG. 3 illustrates a resource grid of a downlink slot. Although it is shown in FIG. 3 that one downlink slot includes 7 OFDM symbols in a time domain, and that one resource block (RB) includes 12 sub-carriers in a frequency domain, this is merely exemplary. And, therefore, the present invention will not be limited only to the example presented in FIG. 3. For example, in case of a normal Cyclic Prefix (CP), one slot includes 7 OFDM symbols. Alternatively, in case of an extended Cyclic Prefix (extended-CP), one slot may include 6 OFDM symbols. Referring to FIG. 3, each element configuring the resource grid is referred to as a resource element (RE). One resource block includes 12×7 resource elements. An NDL number of resource blocks included in a downlink slot may vary in accordance with a downlink transmission bandwidth. The structure of an uplink slot may be identical to the above-described structure of the downlink slot.

Figure 4:
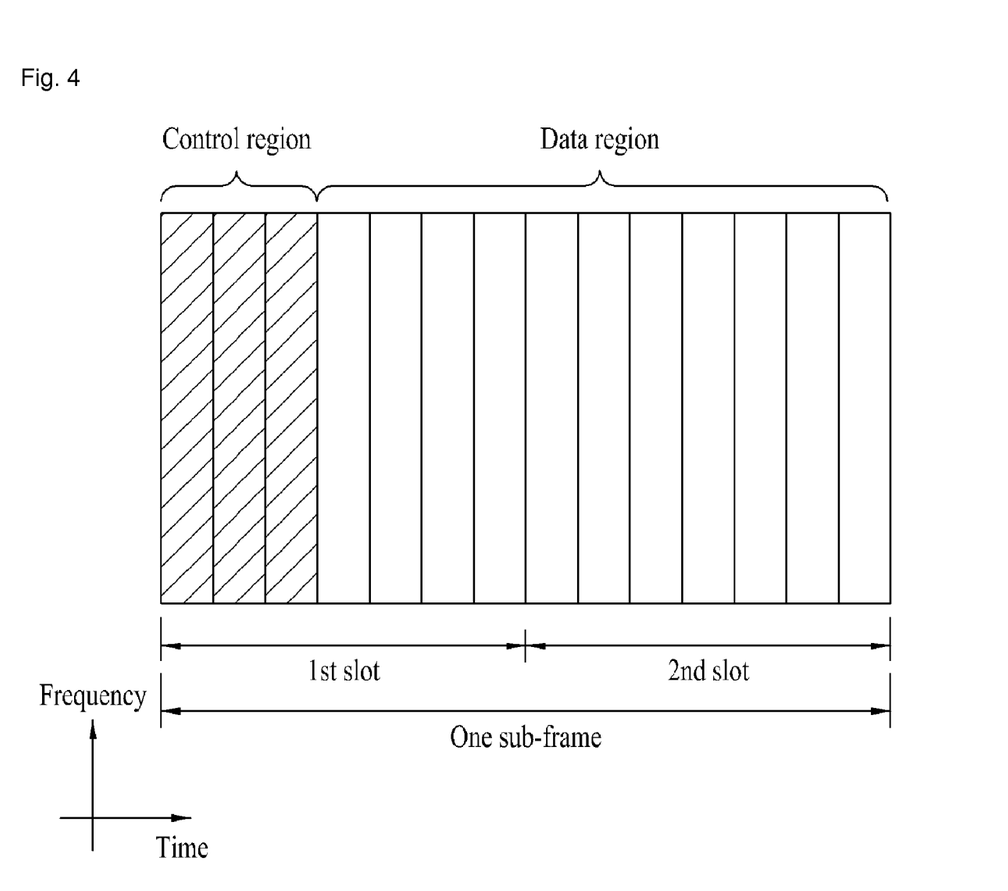
FIG. 4 illustrates an exemplary structure of a downlink sub-frame.

FIG. 4 illustrates an exemplary structure of a downlink sub-frame. A maximum of 3 OFDM symbols located at the front portion of a first slot within one sub-frame corresponds to a control region wherein a control channel is allocated (or assigned). The remaining OFDM symbols correspond to a data region wherein a Physical Downlink Shared Channel (PDSCH) is assigned. Downlink control channels that are being used in the 3GPP LTE system may include a Physical Control Format Indicator Channel (PCFICH), a Physical Downlink Control Channel (PDCCH), a Physical Hybrid automatic repeat request Indicator Channel (PHICH), and so on. The PCFICH includes information on the number of OFDM symbols being transmitted from the first OFDM symbol of a sub-frame and being used in the control channel transmission within the sub-frame. As a response to an uplink transmission, the PHICH includes HARQ ACK/NACK signals. The control information being transmitted through the PDCCH is referred to as Downlink Control Information (DCI). Herein, the DCI may include uplink or downlink scheduling information or may include an uplink transmission power control command on a certain terminal (or user equipment) group. The PDCCH may include information on resource allocation and transmission format of a downlink shared channel (DL-SCH), information on resource allocation of an uplink shared channel (UL-SCH), paging information of a paging channel (PCH), system information of the DL-SCH, resource allocation of an upper layer (or higher level) control message, such as a Random Access Response, that is being transmitted over the PDSCH, a set of transmission power control commands on individual user equipments within the random user equipment group, transmission power control information, information on the activation of a Voice over IP (VoIP), and so on. A plurality of PDCCHs may be transmitted within the control region. And, the user equipment may monitor the plurality of PDCCHs. Herein, the PDCCH may be transmitted in the form of a combination of at least one or more consecutive Control Channel Elements (CCEs). A CCE corresponds to a logical allocation unit used for providing a PDCCH at a coding rate based on a wireless channel state. Herein, the CCE corresponds to a plurality of resource element groups. The number of formats and available data bits of a PDCCH may be decided based upon a correlation between the number of CCEs and the coding rate provided by the CCEs. The base station decides a PDCCH format in accordance with the DCI being transmitted to the user equipment and adds a Cyclic Redundancy Check (CRC) to the control information. Depending upon the owner or usage of the PDCCH, the CRC may be masked with a Radio Network Temporary Identifier (RNTI). If the PDCCH belongs to a particular (or specific) user equipment, a cell-RNTI (C-RNTI) identifier of the user equipment may be masked to the CRC. Alternatively, if the PDCCH belongs to a paging message, a Paging Indicator Identifier (P-RNTI) may be masked to the CRC. If the PDCCH belongs to a system information (more specifically, a system information block (SIB)), a system information identifier and a system information RNTI (SI-RNTI) may be masked to the CRC. In order to indicate the random access response, which corresponds to a response to the transmission of a random access preamble, of the user equipment, a random access RNTI (RA-RNTI) may be masked to the CRC.

Figure 5:
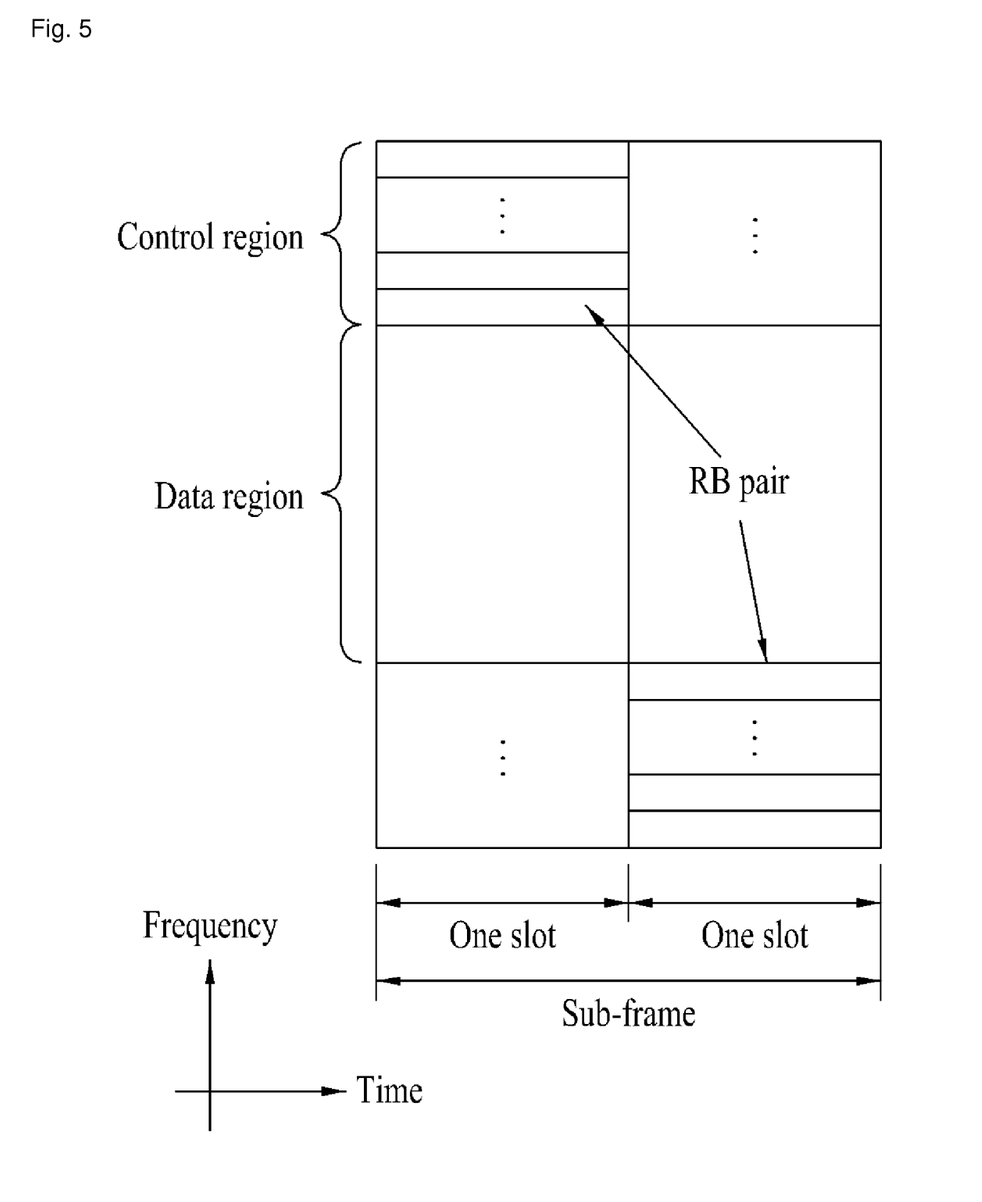
FIG. 5 illustrates an exemplary structure of an uplink sub-frame.

FIG. 5 illustrates an exemplary structure of an uplink sub-frame. In a frequency domain, an uplink sub-frame may be divided into a control region and a data region. A Physical Uplink Control Channel (PUCCH) including uplink control information is allocated to the control region. And, a Physical Uplink Shared Channel (PUSCH) including user data is allocated to the data region. In order to maintain the single carrier property, one user equipment does not transmit the PUCCH and the PUSCH at the same time. The PUCCH for a user equipment is allocated to a resource block pair (RB pair) within a sub-frame. Each of the resource blocks (RBs) belonging to the RB pair occupies a different sub-carrier for 2 slots. This may be referred to as the resource block pair, which is allocated to the PUCCH, as being "frequency-hopped" at the slot boundary.

Carrier Aggregation

In a general wireless communications system, even when the bandwidth for each of an uplink and a downlink is set up differently, only a single carrier is being taken into consideration. For example, based on the single carrier structure, the number of carriers configuring each of the uplink and the downlink respectively corresponds to 1. And, a wireless communications system, wherein the bandwidth of the uplink and the bandwidth of the downlink are generally symmetrical to one another, may be provided.

The ITU (International Telecommunication Union) is requesting the candidate technology of IMT-Advanced to support a more expanded bandwidth as compared to that of the conventional wireless communications system. However, with the exception for some areas throughout the world, there still exist many difficulties in allocating a large bandwidth frequency. Therefore, in order to resolve such difficulties, a carrier aggregation (also referred to as bandwidth aggregation or spectrum aggregation) technology is currently under development. The carrier aggregation technology corresponds to a technology developed for an efficient usage of small segmented bands. More specifically, a plurality of small bands is physically grouped in the frequency domain so that the group of segmented bands can be logically used as one large band.

The carrier aggregation technology is adopted so as to support an increasing throughput, to prevent an increase in the cost caused by the addition of a broadband RF device, and to ensure backward compatibility with the conventional system. More specifically, carrier aggregation refers to a technology enabling a user equipment and a base station to exchange data to and from one another through multiple groups of carriers of a bandwidth unit defined by the conventional wireless communications system (e.g., the LTE system in case of the LTE-A system, and the IEEE 802.16e system in case of the IEEE 802.16m system). Herein, the carrier of the bandwidth unit defined by the conventional wireless communications system may be referred to as a component carrier (CC). For example, the carrier aggregation technology may include a technology supporting a system bandwidth of up to a maximum of 100 MHz by grouping a maximum of 5 component carriers, even when one component carrier supports the bandwidth of 5 MHz, 10 MHz or 20 MHz.

In the following description of the carrier aggregation technology, the base station may represent the macro base station or the micro base station.

A downlink carrier aggregation may be described as supporting downlink transmission from base station to the user equipment by using a frequency domain resource (a sub-carrier or Physical Resource Block (PRB)) of at least one carrier bands within a time domain resource (a sub-frame unit). And, an uplink carrier aggregation may be described as supporting uplink transmission from the user equipment to the base station by using a frequency domain resource (a sub-carrier or PRB) of at least one carrier bands within a time domain resource (a sub-frame unit).

In order to support carrier aggregation, a connection between the base station and the user equipment is required to be set up, or a preparation for a connection set-up between the base station and the user equipment is required to be made, so that a control channel (PDCCH or PUCCH) and/or a shared channel (PDSCH or PUSCH) can be transmitted. In order to perform such connection/connection set-up for each specific terminal, a measurement and/or reporting process on the carrier is required to be performed. And, component carriers corresponding to the targets of such carrier measurement and/or reporting, may be assigned (or allocated). More specifically, component carrier assignment refers to setting up component carriers (i.e., designating number component carriers and component carrier index) that are used for uplink/downlink transmissions, among the uplink/downlink component carriers configured in the base station, while taking into consideration the capability of the specific terminal and the system environment.

Uplink Power Control

In a wireless communication system, the object of power control is to ensure a Signal-to-Noise Ratio (SNR) required by the system by compensating for a path loss and fading of a channel and also to provide a high system capability through an appropriate rank adaptation. Furthermore, an inter-cell interference may be controlled (or adjusted) by the power control.

In the conventional system, the uplink power control is based on a closed-loop correction and also on an open-loop power control. Herein, the open-loop power control is processed by the user equipment (UE), and the closed-loop correction is performed by the base station (evolved Node B (eNB)).

An uplink Transmission Power Control (TPC) command transmitted from the base station may be defined in a DCI format of the PDCCH.

Figure 6:
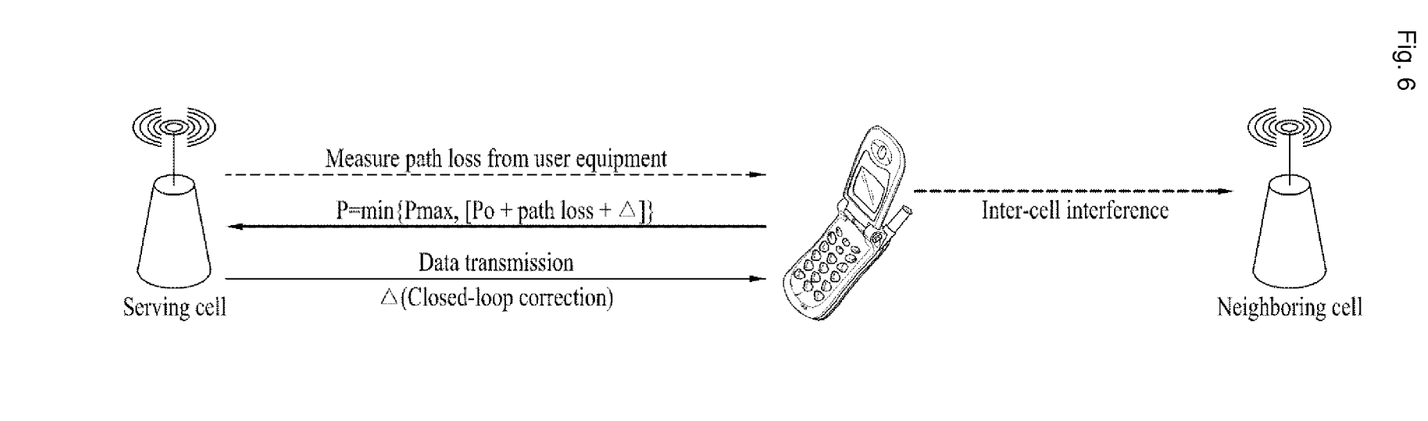
FIG. 6 illustrates a general view describing the basic concept of an uplink power control.

FIG. 6 illustrates a general view describing the basic concept of an uplink power control.

Referring to FIG. 6, the uplink power may be measured by a user equipment through a closed-loop method, and the base station may control the uplink power by using a closed-loop correction factor Δ. The power of an uplink shared channel (PUSCH) may be obtained by using Equation 1 shown below.

MathFigure 1

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad [\text{Math.1}]$$

In Equation 1, the unit of $P_{PUSCH}(i)$ may be expressed as dBm. Referring to Equation 1, i indicates a time index (or a sub-frame index), $P_{CMAX}$ indicates the maximum allowable power, and the maximum allowable power follows (i.e., varies in accordance with) the class of the user equipment. Additionally, $M_{PUSCH}(i)$ is decided in accordance with the assigned resource block. Herein, the value of $M_{PUSCH}(i)$ ranges from 1 to 110, and the value of $M_{PUSCH}(i)$ is updated in each sub-frame. Also, $\alpha(j) \cdot PL$ corresponds to a formula for path loss compensation. Herein, PL represents a downlink path loss that is measured by the user equipment, and α indicates to a scaling value, which corresponds to a value less than or equal to 1, and which can be expressed as a value of 3 bits. More specifically, if α is equal to 1, this indicates that the path loss has been completely compensated. Alternatively, if α is less than 1, this indicates that the path loss has been partially compensated.

$P_{O\_PUSCH}(j)$ may be calculated by using Equation 2 shown below.

MathFigure 2

$$P_{O\_PUSCH}(j) = P_{O\_NOMINAL\_PUSCH}(j) + P_{O\_UE\_PUSCH}(j) \quad [\text{Math.2}]$$

Herein, $P_{O\_PUSCH}(j)$ is provided as cell-specific by a higher layer, and $P_{O\_UE\_SPECIFIC}(j)$ is provided UE-specific by the higher layer.

In Equation 1, f(i) corresponds to a specific parameter of the user equipment that is controlled by the base station. Herein, f(i) may be calculated by using Equation 3 shown below.

MathFigure 3

$$f(i) = f(i-1) + \delta_{PUSCH}(i - K_{PUSCH}) \quad [\text{Math.3}]$$

As shown in Equation 3, $\delta_{PUSCH}$ corresponds to a UE-specific correction value. Herein, $\delta_{PUSCH}$ may also be referred to as a transmission power control (TPC) command. $\delta_{PUSCH}$ may be included in the PDCCH of a DCI format 0 or may be jointly coded with other TPC commands in the PDCCH of a DCI format 3/3A.

Accumulated values of $\delta_{PUSCH}$ dB that is signaled over the PDCCH of the DCI format 0 may be given as shown in Table 1 below. Additionally, the accumulated values of $\delta_{PUSCH}$ dB that is signaled over the PDCCH of the DCI format 3 may also be given as shown in Table 1 below.

TABLE 1

| TPC Command Field in DCI format 0/3 | Accumulated $\delta_{PUSCH}$ [dB] | Absolute $\delta_{PUSCH}$ [dB] only DCI format 0 |
|---|---|---|
| 0 | −1 | −4 |
| 1 | 0 | −1 |
| 2 | 1 | 1 |
| 3 | 3 | 4 |

Meanwhile, the power control for the uplink control channel (PUCCH) may be defined as Equation 4 shown below.

MathFigure 4

$$P_{PUCCH}(i) = \min\{P_{CMAX}, P_{0\_PUCCH} + PL + h(n_{CQI}, n_{HARQ}) + \Delta_{F\_PUCCH}(F) + g(i)\} \quad [\text{Math.4}]$$

As shown in Equation 4, the unit of $P_{PUCCH}(i)$ may be expressed as dBm. Referring to Equation 4, $$\Delta_{F\_PUCCH}(F)$$

is provided by a higher layer, and each value of $$\Delta_{F\_PUCCH}(F)$$

corresponds to a PUCCH format (F) related with PUCCH format 1a. Additionally, $$h(n_{CQI}, n_{HARQ})$$

is a value subordinate to the PUCCH format, and $n_{CQI}$ corresponds to a number information bit for Channel Quality Information (CQI). And, $n_{HARQ}$ corresponds to a number of Hybrid Automatic Repeat request (HARQ) bits.

PUCCH formats 1, 1a, and 1b respectively satisfy Equation 5 shown below.

MathFigure 5

$$h(n_{CQI}, n_{HARQ}) = 0 \quad [\text{Math.5}]$$

And, PUCCH formats 2, 2a, and 2b and a normal cyclic prefix (CP) respectively satisfy Equation 6 shown below.

MathFigure 6

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases} \quad [\text{Math.6}]$$

Furthermore, PUCCH format 2 and an extended cyclic prefix (extended-CP) respectively satisfy Equation 7 shown below.

MathFigure 7

$$h(n_{CQI}, n_{HARQ}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}$$ [Math. 7]

Meanwhile, $P_{O\_PUCCH}(j)$ represents a parameter configured of a sum of $P_{O\_NOMINAL\_PUCCH}(j)$ and $P_{O\_NOMINAL\_SPECIFIC}(j)$. Herein, $P_{O\_NOMINAL\_PUCCH}(j)$ is provided to a specific cell by a higher layer, and $P_{O\_UE\_SPECIFIC}(j)$ is provided to a specific user equipment cell by the higher layer.

Referring to Equation 4, g(i) represents a current PUCCH power control adjustment state. More specifically, g(i) may be calculated by using Equation 8 shown below.

MathFigure 8

$$g(i) = g(i-1) + \sum_{m=0}^{M-1} \delta_{PUCCHl}(i - k_m)$$ [Math. 8]

As shown in Equation 8, $\delta_{PUCCH}$ corresponds to a UE-specific correction value. The $\delta_{PUCCH}$ may also be referred to as a Transmission Power Control (TPC) command. Herein, the $\delta_{PUCCH}$ is included in the PDCCH along with the DCI format. Alternatively, the $\delta_{PUCCH}$ may be jointly coded with a specific PUCCH correction value of another user equipment so as to be transmitted over the PDCCH along with the DCI format 3/3A. A CRC parity bit of the DCI format 3/3A may be scrambled with a Radio Network Temporary Identifier (TPC-PUCCH-RNTI).

Meanwhile, being added to the PUCCH and the PUSCH, the power of a Sounding Reference Signal (SRS) may be controlled by using Equation 9 shown below.

MathFigure 9

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\}$$ [Math.9]

Referring to Equation 9, $M_{SRS}$ corresponds to an SRS transmission bandwidth of sub-frame i being expressed as the number of resource blocks. Furthermore, f(i) represents a current power control adjustment for the PUSCH in the form of a function.

As described above, according to the conventional uplink power control method, the uplink transmission power control range that can be dynamically adjusted (or controlled) by the base station is limited. For example, in case of an accumulated mode, only the transmission power of a maximum of 1 dB can be reduced with respect to one power control command. When using such a power control method, it may be difficult to dynamically and adequately control the inter-cell interference control, which is caused by an abrupt change in condition (or environment).

Considering this characteristic, the present invention proposes a scheme enabling the base station to dynamically mute the uplink transmission of a specific user equipment. The muting of the uplink transmission may include that the transmission power is set to 0 or set to a minimum transmission power level. In order to support such muting of the uplink transmission, when the user equipment receives a specific signal from the base station, the entire uplink transmission or only a portion of the uplink transmission of the PUSCH/PUCCH/SRS may be muted.

Moreover, muting the uplink signal transmission may also be used as reducing inter-cell interference in the above-described heterogeneous network, which will hereinafter be described in detail.

As compared to a homogeneous network environment wherein only macro base stations (or only micro base stations) exist, a more critical inter-cell interference may occur in a heterogeneous network, wherein a macro base station co-exists with a micro base station. For example, due to a difference in the maximum transmission power of the base station (eNB), a downlink (DL) serving cell (e.g., a macro base station) selected based upon a reception signal power may be different from an uplink (UL) serving cell (e.g., a micro base station) selected based upon a path loss.

For example, it is assumed that a user equipment is positioned to be more adjacent to the micro base station than to the macro base station. In this case, since the transmission power of the macro base station is greater (or higher) than the transmission power of the micro base station, even though the user equipment is positioned closer to the micro base station, the user equipment may recognize the strength of the downlink signal of the macro base station as being greater than the strength of the downlink signal of the micro base station. Thus, the macro base station may be selected as the serving cell. In this case, when the user equipment performs an uplink transmission to the macro base station, due to a large distance between the macro base station and the user equipment, the user equipment may transmit the uplink signal to the macro base station by using a greater transmission power level in order to compensate for the distance between the macro base station and the user equipment. Here, due to the uplink transmission performed by using a high transmission power level, the micro base station located near the user equipment may experience a strong interference.

More specifically, when the DL serving cell and the UL serving cell are decided based upon the reception signal power of the user, as in the conventional homogeneous network, and when the macro-terminal being served by the macro base station is positioned to be more adjacent to the micro base station than the macro base station, the UL signal of the macro-terminal may cause a strong interference to the micro base station. Similarly, since the distance between the user equipment and the interfering cell is also close in the DL channel, an inter-cell interference may occur between the micro base station and the macro base station.

Additionally, in case the micro base station corresponds to a CSG micro base station configured to serve only specific terminals, even if the macro-terminal is located within the coverage area of the micro base station, the macro-terminal cannot receive any DL/UL service from the micro base station. Moreover, since the macro-terminal still performs communication within the macro base station, a critical interference may occur. For example, when a specific macro-terminal moves to a position more adjacent to the CSG micro base station, due to the uplink signal being transmitted from the corresponding terminal to the macro base station, a critical interference may occur in the uplink of the micro base station.

At this point, if the macro base station is capable of knowing the location of the corresponding terminal or the path loss between the corresponding terminal and the micro base station, by muting the uplink transmission of the corresponding terminal, the above-described inter-cell interference may be reduced.

Most particularly, such muting of the uplink transmission is required to be performed dynamically. According to the conventional method, the macro base station may readjust the resource position of the uplink channel causing the interference or may release the corresponding channel only through RRC signaling for some UL channels (e.g., PUCCH for periodic CQI report, UL semi-persistent scheduling, scheduling request, and SRS). However, since the RRC signaling requires a long delay and a considerable amount of resource consumption, the application of the RRC signaling may be inefficient in adjusting the uplink channel. For example, while moving, when the user equipment becomes adjacent to the micro base station, thereby causing an interference, the terminal may be scheduled an uplink channel adjustment with respect to such interference through RRC signaling. However, when scheduling information is arrived to the user equipment, the user equipment may have already moved out of the coverage area of the corresponding micro base station due to a long delay of the RRC signaling. Meanwhile, in case the uplink transmission is being adjusted by using dynamic signaling through L1/L2 control channels, instead of using the RRC signaling, the inter-cell interference caused by the corresponding uplink channel may be efficiently controlled. More specifically, since the PUCCH, which can transmit a scheduling request (SR) or a periodic CQI report, is assigned semi-statically using an RRC signal, and since the transmission resource of the SRS is decided based upon the RRC signal, the dynamic muting is efficient for controlling interference caused by the PUCCH, which transmits the SR and the periodic CQI, or by the SRS.

Hereinafter, the operations of the base station transmitting a signal for dynamic muting and of user equipment after receiving the transmitted signal, will hereinafter be described in detail.

First of all, the operations of the base station transmitting a signal to the user equipment in order to perform dynamic muting will now be described in detail.

The base station may reuse an already-existing field of the transmission power control (TPC) command so that the reused field can be used as a signal for uplink dynamic muting. The re-usage of an already-existing field means that a bit value of a field that has already been defined is used for another purpose. For example, a TPC command field having the length of 2 bits defined in the DCI format 0/3, as shown in the above-described Table 1, may be corrected as shown below in Table 2. Accordingly, when the TPC command field is set to 3, settings may be made so that the muting of the uplink transmission can be indicated.

TABLE 2

| TPC Command Field in DCI format 0/3 | Accumulated $\delta_{PUSCH}$ [dB] |
| --- | --- |
| 0 | −1 |
| 1 | 0 |
| 2 | 1 |
| 3 | MUTE |

Alternatively, a specific field may be added to the TPC command, and the added field may be used as the signal for dynamic muting. For example, when a separate field is set to have the size of 1 bit, as the corresponding field is set to 0 or 1, the uplink transmission muting may be set to be activated and/or deactivated.

Also, the bit length of the TPC command field may be extended, and, among the states that can be additionally designated in accordance with the extension of the TPC command field, one of the states may be set up as an uplink transmission muting state. For example, if the TPC command field, which is originally set to have the length of 2 bits (wherein a total of 4 states can be designated), is extended to 3 bits, a total of 8 states can be designated. Herein, among the 4 states that can be additionally designated, one state may be used for indicating dynamic uplink transmission muting.

Furthermore, if the TPC command field is indicated by a minimum value in N number of consecutive TPC commands, the corresponding TPC field may be set up to indicate the muting of the uplink transmission. For example, if the TPC command field received by the terminal is consecutively set to '0' for N number of times (wherein N≥1), the corresponding terminal may perform the muting of the uplink transmission. Herein, a parameter N for the consecutive TPC command may be notified by the base station to the corresponding terminal through the RRC signal or through system information (SI) that is being broadcasted.

Information as to whether or not an uplink transmission performed by a terminal, which is being served by a macro base station, is causing an interference with a neighboring base station (micro base station) may be decided by the macro base station based upon a signaling transmitted from the corresponding terminal or from the neighboring base station. For example, based upon a measurement report on a Reference Signal Received Power (RSRP) transmitted from the terminal, it may be determined whether or not the corresponding terminal is causing any interference.

Hereinafter, the operations performed by the terminal for muting the uplink transmission will be described in detail.

When the terminal receives a signal indicating dynamic uplink transmission muting by using the various schemes described above, the corresponding terminal may not perform any uplink transmission (i.e., the uplink transmission power is set to 0), or the corresponding terminal may set the uplink transmission power to a minimum transmission power level.

The terminal may apply the uplink transmission muting to the entire uplink transmission channel or to only a portion of the uplink transmission channel. For example, the terminal may apply the uplink transmission muting to all uplink channels (i.e., PUSCH, PUCCH, SRS, and so on). And, in some cases, as described above, the terminal may only apply the uplink transmission muting to uplink transmission channels (PUCCH (SR or periodic CQI reporting), SRS, and so on) that are configured by RRC signaling. In case the dynamic uplink transmission muting is applied only to the uplink channel being configured by the RRC signaling, the PUSCH, which is dynamically scheduled, is transmitted by using a transmission power according to the conventional power control without being muted. Herein, the above-described case may be advantageously applied when a coordination between the macro base station and the micro base station is realized for the PUSCH transmission and/or reception. In addition to the above-described examples, an uplink transmission channel applying the dynamic uplink muting may be appropriately selected while taking into consideration the degree of causing interference. The base station may notify the user equipment of an uplink channel being the application target of the dynamic muting through a higher layer signal.

In generating a dynamic muting command, the base station may take into consideration whether or not the corresponding user equipment causes an interference to a neighboring cell. Accordingly, the corresponding user equipment may notify the serving base station through explicit signaling of the fact that the uplink transmission performed via a specific component carrier, a specific frequency resource, or a specific physical channel may cause a strong interference with a neighboring cell. For example, the user equipment may transmit a signal requesting the base station not to perform any further scheduling for a specific component carrier, a specific frequency resource, or a specific physical channel through a higher layer signal or via a physical channel. Such request signal may be expressed as a scheduling done request, a scheduling stop request, a muting request, and so on.

In the above-described example of the present invention, the process performed by the user equipment of dynamically muting an uplink transmission depending upon the signaling of the base station is described. Additionally, the present invention also proposes a scheme performed by the user equipment of autonomously muting an uplink transmission while taking its surrounding environment into consideration.

For example, when the path loss between the user equipment and a specific micro cell is equal to or below a predetermined threshold value (or when the strength of a signal received from the specific micro cell is equal to or greater than the predetermined threshold value), the user equipment may mute the uplink transmission on the specific component carrier, the specific frequency resource, or the specific physical channel.

In order to assist on the autonomous dynamic muting operation performed by the user equipment, the base station may notify the user equipment of an identifier of a neighboring cell that is being affected by the interference (e.g., cell identifier (cell ID) of each micro cell within the surrounding area of the user equipment). Additionally, the base station may notify the corresponding user equipment of the predetermined threshold value of the path loss (or receiving signal strength) determining whether or not to perform muting. The above-described neighboring cell identifier and the threshold value of the path loss (or receiving signal strength) may be notified to the user equipment by the base station through a higher layer signal. Alternatively, the reference value of the path loss (or receiving signal strength) may be provided to the user equipment as a predetermined value without performing any separate signaling.

Furthermore, the base station may limit the type of physical channels (e.g., PUSCH, PUCCH, SRS, and so on), through which the user equipment can perform the dynamic muting operation, or limit the type of frequency resources that are used to perform the dynamic muting operation. The signal that is used to limit the muting operation may be delivered to the corresponding user equipment through a higher layer signal.

With respect to the fact that the base station is incapable of accurately predicting the muting operation of the user equipment, the above-described autonomous dynamic muting method performed by the user equipment may be more suitable for cases transmitting UL signal (e.g., SRS transmission) other than the data that must be delivered or control information.

In performing the operation of autonomously and dynamically muting the uplink transmission, the user equipment may directly receive the control signal of a neighboring micro cell and use the control signal including resource allocation information. For example, the micro cell may broadcast a control signal of its own resource allocation information (e.g., position of a frequency resource that is to be used for a predetermined period of time, a pattern of a sub-frame that is to be used, and so on) through a control channel such as the PDCCH. Accordingly, a macro-terminal neighboring the corresponding micro cell may receive and acquire the resource allocation information that is broadcasted from the micro cell. In performing the autonomous dynamic uplink transmission muting, the macro-terminal may use the resource allocation information acquired from the micro cell. For example, when the path loss between a specific macro-terminal and a specific micro cell is equal to or below a predetermined threshold value (or when the strength of a signal received from the specific micro cell is equal to or greater than the predetermined threshold value), the macro-terminal may perform an uplink transmission muting process on the resource (e.g., sub-frame or frequency resource) used by the corresponding micro cell based upon the acquired resource allocation information according to the above-described method.

In the description of the present invention, an example of an uplink transmission performed by a user equipment (i.e., macro-terminal), which is served by a macro cell, causing an interference with a micro cell is given to describe the uplink transmission muting method. However, the present invention will not be limited only to the example given in the description of the present invention. In other words, the principles of the method of dynamically muting an uplink transmission may also be applied to a case wherein an uplink transmission performed by a user equipment (i.e., micro-terminal), which is served by a micro cell, causes an interference with a macro cell. More specifically, when an uplink transmission from a micro-terminal to a micro cell interference with a macro cell, the uplink transmission may be autonomously and dynamically muted by a signaling operation performed by the micro-cell or by a signaling operation performed by the micro-terminal.

Figure 7:
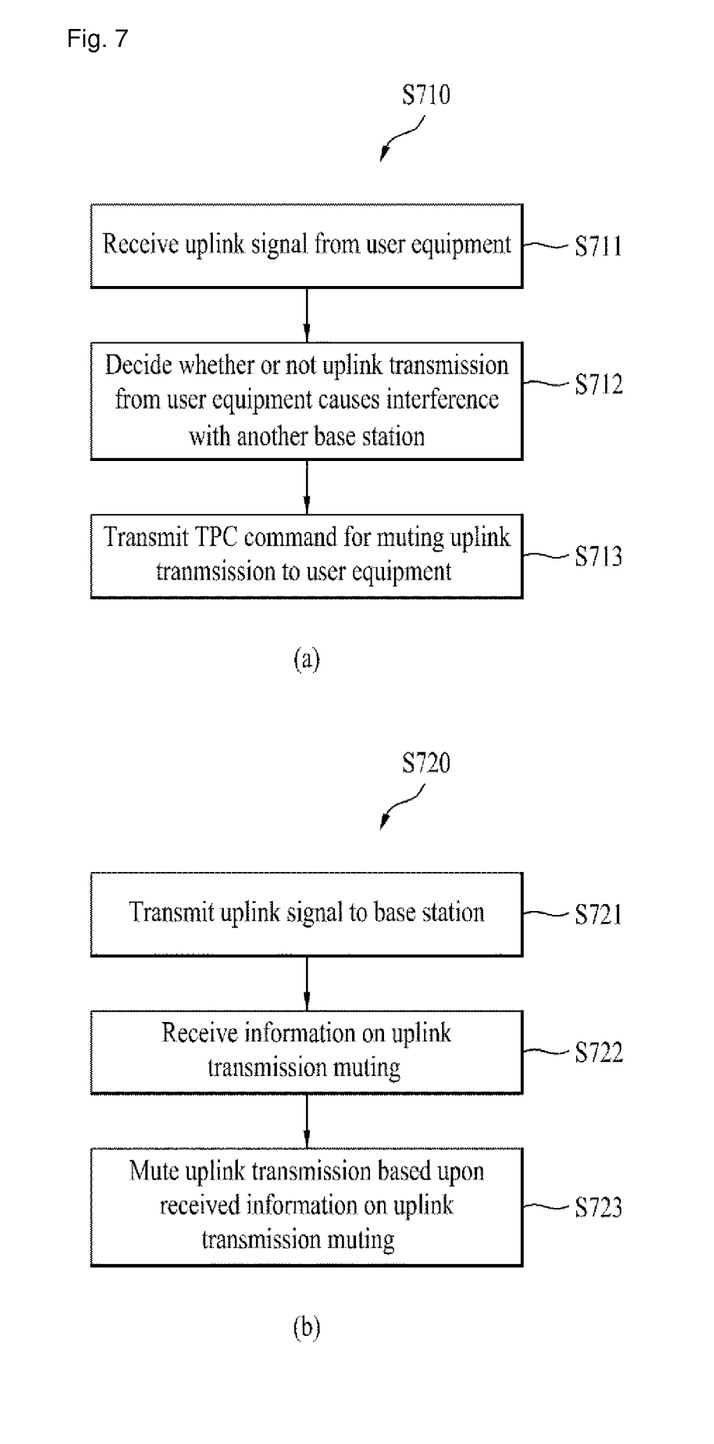
FIG. 7 illustrates a flow chart showing the process steps of a method for controlling an uplink transmission power.

FIG. 7 illustrates a flow chart showing the process steps of a method for controlling an uplink transmission power. FIG. 7(a) illustrates a flow chart showing the process steps of a method for controlling an uplink transmission power control 710 performed by the base station, and FIG. 7(b) illustrates a flow chart showing the process steps of a method for controlling an uplink transmission power control 720 performed by the user equipment.

Referring to FIG. 7(a), when an uplink transmission performed by a user equipment causes an interference with another base station (e.g., a micro base station neighboring the user equipment), the method for dynamically controlling the uplink transmission power from the corresponding user equipment will now be described in detail.

In step S711, a base station may receive an uplink signal from a user equipment being served by the base station. In step S712, the base station may decide whether or not an uplink transmission performed by the user equipment causes an interference with another base station (e.g., a micro base station neighboring the user equipment). This decision may be performed based upon a signaling from the user equipment or the other base station.

In step S713, the base station may transmit transmission power control (TPC) command that mutes the uplink transmission to the user equipment. The TPC command muting the uplink transmission may include information setting up the uplink transmission power to 0 or to a minimum value. Additionally, the TPC command muting the uplink transmission may be directed by a specific bit value of a TPC command field, or the TPC command muting the uplink transmission may be directed by having the specific bit value of the TPC command field be consecutively set up for N number of times (wherein N≥1). Moreover, the TPC command muting the uplink transmission may be transmitted as downlink control information (DCI) through a physical downlink control channel (PDCCH). Furthermore, the TPC command muting the uplink transmission may include information on at least one of a component carrier, a frequency resource, and a physical channel having the respective uplink transmission muted. For example, the TPC command muting the uplink transmission may include a command for muting the transmission of at least one of a scheduling request, a periodic channel quality information reporting, and a sounding reference signal.

For details on the dynamic uplink transmission power control performed by the base station, reference may be made on the various methods proposed in the present invention.

Meanwhile, referring to FIG. 7(b), the method performed by the user equipment for dynamically controlling the uplink transmission power in accordance with a signaling of the base station, or the method performed by the user equipment for autonomously and dynamically controlling the uplink transmission power will now be described in detail.

In step S721, the user equipment may transmit an uplink signal to a serving base station. In step S722, the user equipment may receive information on uplink transmission muting. Herein, information on the uplink transmission muting may include a transmission power control (TPC) command directing an uplink transmission muting from the serving base station, or the information on the uplink transmission muting may include information enabling the user equipment to decide whether or not to mute the uplink transmission.

In association with step S721, when uplink transmission muting is performed by the TPC command, the TPC command muting the uplink transmission may be directed by a specific bit value of a TPC command field, or the TPC command muting the uplink transmission may be directed by having the specific bit value of the TPC command field be consecutively set up for N number of times (wherein N≥1). Additionally, the TPC command muting the uplink transmission may be received as downlink control information (DCI) through a physical downlink control channel (PDCCH). Furthermore, the TPC command muting the uplink transmission may include information on at least one of a component carrier, a frequency resource, and a physical channel having the respective uplink transmission muted. For example, the TPC command muting the uplink transmission may include a command for muting the transmission of at least one of a scheduling request, a periodic channel quality information reporting, and a sounding reference signal.

Meanwhile, in association with step S721, when the information enabling the user equipment to decide whether or not to perform the uplink transmission muting operation is provided from base station, the corresponding information may include at least one of an identifier of a neighboring base station, a resource allocation information of a neighboring base station, a path loss reference value, and a received signal strength reference value. The resource allocation information of a neighboring base station may be directly received by the user equipment from the neighboring base station via broadcasting. Additionally, a path loss value directly measured by the user equipment from the neighboring base station or the strength of a received signal measured by the user equipment from the neighboring base station may also be used as the information enabling the user equipment to decide whether or not to perform the uplink transmission muting operation.

Furthermore, although it is not shown in FIG. 7(b), the user equipment may transmit a scheduling stop request signal to the base station, so that the base station can generate a TPC command for the uplink transmission muting operation, or so that the base station can provide information enabling the user equipment to decide whether or not to perform the uplink transmission muting operation.

In step S723, the user equipment may mute the uplink transmission based upon the information on the uplink transmission muting. More specifically, when the information on the uplink transmission muting corresponds to the TPC command, the uplink transmission may be muted in accordance with the information on the uplink transmission muting. Alternatively, when the information on the uplink transmission muting corresponds to information enabling the user equipment to decide whether or not to perform the uplink transmission muting, the user equipment may decide to perform and may perform the uplink transmission muting operation based upon the information on uplink transmission muting. The operation of muting the uplink transmission may include a step of setting up the uplink transmission power to 0 or to a minimum value.

For details on the dynamic uplink transmission power control performed by the user equipment, reference may be made on the various methods proposed in the present invention.

An example of the method for dynamically controlling an uplink transmission power, which can be applied to a plurality of methods proposed in the present invention, has been described in detail with reference to FIG. 7. However, the present invention will not be limited only to the example given in the description of the present invention. More specifically, according to the plurality of methods proposed in the present invention, in applying the method described with reference to the FIG. 7, a process of deciding whether or not to transmit a dynamic uplink transmission power control signal, a request signal, a dynamic uplink transmission, and so on may be performed.

Figure 8:
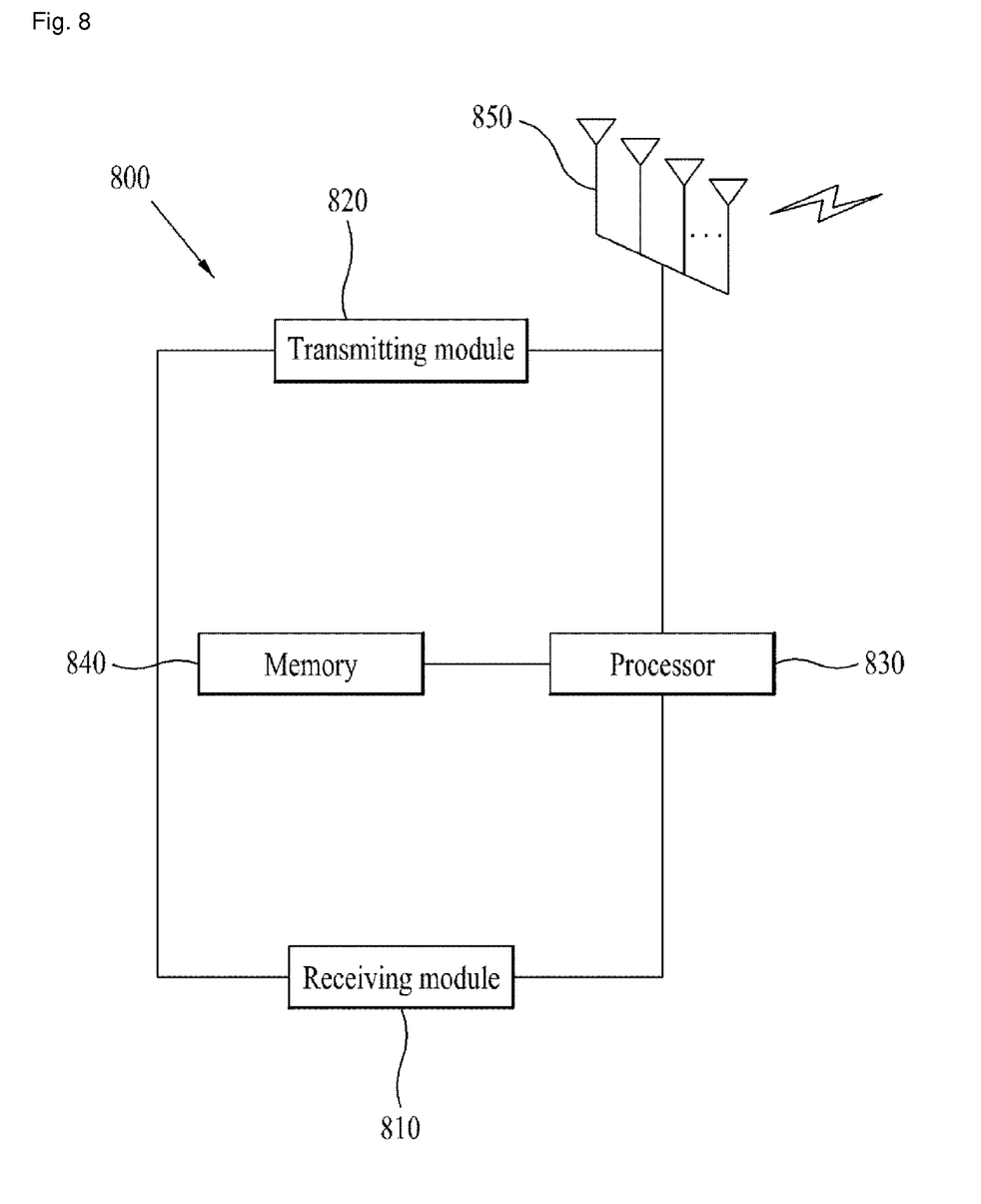
FIG. 8 illustrates the structure of a base station device or a terminal device according to a preferred embodiment of the present invention.

FIG. 8 illustrates the structure of a base station device or a terminal device according to a preferred embodiment of the present invention.

Referring to FIG. 8, a base station device 800 according to the present invention may include a receiving module 810, a transmitting module 820, a processor 830, a memory 840, and a plurality of antennae 850. Herein, the plurality of antennae signifies that the base station device of FIG. 8 supports MIMO transmission and/or reception.

The receiving module 810 may receive various types of signals, data, and information via the uplink from the user equipment. The transmitting module 820 may transmit various types of signals, data, and information via downlink to the user equipment. The processor 830 may control the overall operations of the base station device 800.

The processor 830 of the base station may be configured to receive an uplink signal from a user equipment being served by the base station, to decide whether or not the uplink transmission from the user equipment to the base station causes an interference with another base station, and to transmit a transmission power control (TPC) command for muting the uplink transmission to the user equipment. For further details on the dynamic uplink transmission power control performed by the base station, reference may be made to the variety of methods proposed in the description of the present invention.

Meanwhile, referring to FIG. 8, a user equipment (or terminal) device 800 according to the present invention may include a receiving module 810, a transmitting module 820, a processor 830, a memory 840, and a plurality of antennae 850. Herein, the plurality of antennae signifies that the user equipment device of FIG. 8 supports MIMO transmission and/or reception.

The receiving module 810 may receive various types of signals, data, and information via the uplink from the base station. The transmitting module 820 may transmit various types of signals, data, and information via downlink to the base station. The processor 830 may control the overall operations of the user equipment device 800.

The processor 830 of the user equipment may be configured to transmit an uplink signal to the base station, to receive information on uplink transmission muting, and to mute an uplink transmission based upon the received information on uplink transmission muting. For further details on the dynamic uplink transmission power control performed by the user equipment, reference may be made to the variety of methods proposed in the description of the present invention.

Additionally, the processor of the base station device or the processor of the user equipment device may perform functions of operating and processing information received by the base station device or the user equipment device, information that is to be transmitted outside the system, and so on. Furthermore, the memory 840 may store the operated and processed information for a predetermined period of time. Herein, the memory 840 may also be replaced by other components such as a buffer (not shown).

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The above-described embodiments of the present invention may be applied to a wide range of mobile communications systems.

The invention claimed is:

1. A method for dynamically controlling an uplink transmission power at a user equipment, the method comprising:
   transmitting an uplink signal to a base station;
   receiving information on uplink transmission muting;
   deactivating the uplink transmission based upon a transmission power control (TPC) command, when the information on the uplink transmission muting includes the TPC command from the base station directing the uplink transmission to be deactivated; and
   determining whether or not deactivating the uplink transmission and deactivating the uplink transmission based upon information for determining whether or not deactivating the uplink transmission, when the information on the uplink transmission muting includes the information for determining whether or not deactivating the uplink transmission,
   wherein:
   the information for determining whether or not deactivating the uplink transmission includes at least one of a threshold value of a path loss or a threshold value of an intensity for a received signal, and
   the user equipment determines to deactivate the uplink transmission, when a path loss is equal to or below the threshold value of a path loss or an intensity for a received signal is equal to or greater than the threshold value of an intensity for a received signal.

2. The method of claim 1, further comprising:
   transmitting a scheduling stop request signal to the base station.

3. The method of claim 1, wherein the TPC command muting the uplink transmission is indicated by a specific bit value of a TPC command field.

4. The method of claim 1, wherein the TPC command muting the uplink transmission is indicated by having a specific bit value of a TPC command field consecutively set-up for N (N≥1) number of times.

5. The method of claim 1, wherein the TPC command muting the uplink transmission includes information on at least a component carrier, a frequency resource, or a physical channel in which the uplink transmission is deactivated.

6. The method of claim 1, wherein the TPC command muting the uplink transmission includes a command for deactivating transmission of at least a scheduling request, a periodic channel quality information reporting, or a sounding reference signal.

7. The method of claim 1, wherein the information on uplink transmission muting includes information used for the user equipment to determine whether or not to mute the uplink transmission.

8. The method of claim 7, wherein the information used for the user equipment to determine whether or not to mute the uplink transmission includes at least an identifier of a neighboring base station, a resource allocation information of a neighboring base station, a path loss reference value, or a received signal strength reference value.

9. A user equipment for dynamically controlling an uplink transmission power, the base station comprising:
- a receiving module configured to receive a downlink signal;
- a transmitting module configured to transmit an uplink signal; and
- a processor configured to control the receiving module and the transmitting module,
- wherein the processor is further configured to:
- transmit an uplink signal to a base station through the transmitting module;
- receive information on uplink transmission muting;
- deactivate the uplink transmission based transmission power control (TPC) command, when the information on the uplink transmission muting includes the TPC command from the base station directing the uplink transmission to be deactivated; and
- determines whether or not deactivating the uplink transmission and deactivates the uplink transmission based upon information for determining whether or not deactivating the uplink transmission, when the information on the uplink transmission muting includes the information for determining whether or not deactivating the uplink transmission, wherein:
the information for determining whether or not deactivating the uplink transmission includes at least one of a threshold value of a path loss or a threshold value of an intensity for a received signal, and
the user equipment determines to deactivate the uplink transmission, when a path loss is equal to or below the threshold value of a path loss or an intensity for a received signal is equal to or greater than the threshold value of an intensity for a received signal.

* * * * *